(12) United States Patent
She et al.

(10) Patent No.: US 9,501,500 B2
(45) Date of Patent: Nov. 22, 2016

(54) SYSTEMS AND METHODS FOR IMAGE FILE PROCESSING

(71) Applicant: Tencent Technology (Shenzhen) Company Limited, Shenzhen (CN)

(72) Inventors: Zehan She, Shenzhen (CN); Tingjun Hong, Shenzhen (CN); Yongdao Li, Shenzhen (CN); Yipeng Duan, Shenzhen (CN); Yi Lu, Shenzhen (CN); Dayi Huang, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 149 days.

(21) Appl. No.: 14/306,380

(22) Filed: Jun. 17, 2014

(65) Prior Publication Data

US 2014/0337744 A1 Nov. 13, 2014

Related U.S. Application Data (63) Continuation of application No. PCT/CN2014/074653, filed on Apr. 2, 2014.

(30) Foreign Application Priority Data

May 10, 2013 (CN) .......................... 2013 1 0172861

(51) Int. Cl.
- *G06F 3/14* (2006.01)
- *G06F 17/30* (2006.01)
- *G06F 3/0484* (2013.01)

(52) U.S. Cl.
CPC ......... *G06F 17/3028* (2013.01); *G06F 3/0484* (2013.01)

(58) Field of Classification Search
CPC .................................... G06F 3/14; G06F 3/17

USPC ............... 715/738, 739; 725/110; 705/14.72; 348/143

See application file for complete search history.

(56) References Cited

U.S. PATENT DOCUMENTS

| 7,089,279 B1 | 8/2006 | Sakaguchi |
| 2004/0008253 A1* | 1/2004 | Monroe ........... G08B 13/19641 348/143 |

(Continued)

FOREIGN PATENT DOCUMENTS

| CN | 1674673 A | 9/2005 |
| CN | 101083584 A | 12/2007 |
| CN | 102209111 A | 10/2011 |
| CN | 102325232 A | 1/2012 |
| CN | 102891891 A | 1/2013 |

OTHER PUBLICATIONS

Patent Cooperation Treaty, International Search Report and Written Opinion of the International Searching Authority, PCT/CN2014/074653, mailed Jul. 9, 2014.

(Continued)

*Primary Examiner* — Ruay Ho
(74) *Attorney, Agent, or Firm* — Jones Day (57) ABSTRACT

Systems and methods are provided for processing image files. For example, an IP interface for image-file remote connections is searched for on a Local Area Network (LAN) based on at least information associated with one or more predetermined search operations on a user interface for image-file control; an image file is extracted using the IP interface for image-file remote connections; and the extracted image file is processed based on at least information associated with a click operation detected on a control-program interface provided by the user interface.

9 Claims, 9 Drawing Sheets

(56) References Cited

U.S. PATENT DOCUMENTS

| | | | | |
|---|---|---|---|---|
| 2010/0251315 A1* | 9/2010 | Ohmae | ............... | H04L 12/1859 725/110 |
| 2011/0202847 A1* | 8/2011 | Dimitrov | .............. | G06F 3/0481 715/738 |
| 2015/0254732 A1* | 9/2015 | Snyder | ............... | G06Q 30/0277 705/14.72 |

OTHER PUBLICATIONS

Patent Cooperation Treaty, International Preliminary Report on Patentability, PCT/CN2014/074653, issued Nov. 10, 2015.

China Patent Office, Office Action issued Apr. 28, 2016, in Application No. 201310172861.3.

\* cited by examiner

Figure 9

SYSTEMS AND METHODS FOR IMAGE FILE PROCESSING

CROSS-REFERENCES TO RELATED APPLICATIONS

This application claims priority to Chinese Patent Application No. 201310172861.3, filed May 10, 2013, incorporated by reference herein for all purposes.

BACKGROUND OF THE INVENTION

Certain embodiments of the present invention are directed to computer technology. More particularly, some embodiments of the invention provide systems and methods for data processing. Merely by way of example, some embodiments of the invention have been applied to image file processing. But it would be recognized that the invention has a much broader range of applicability.

With the development of electronic technology and the improvement of living standards, cameras, mobile phones, tablet computers, and other electronic equipment are available to many households. Users can take pictures of their favorite images according to personal tastes anytime and anywhere with a camera, a mobile phone or a tablet with a built-in camera for future enjoyment.

Users can also use image-processing software, such as Photoshop, to process the captured images so as to obtain more beautiful images. In addition, users can share the processed images (e.g., photos) through instant-messaging applications, multimedia messaging applications, or other suitable methods.

The existing image-processing technology is limited to sharing image files stored on computers with mobile terminals through the Internet or other communication networks. How to extract processed image files or image files under processing directly from an image-processing software, such as Photoshop, using a user interface to mobile terminals (e.g., smart phones) on a Local Area Network (LAN) has become a hot area of research.

Hence it is highly desirable to improve the techniques for processing image files.

BRIEF SUMMARY OF THE INVENTION

According to one embodiment, a method is provided for processing image files. For example, an IP interface for image-file remote connections is searched for on a Local Area Network (LAN) based on at least information associated with one or more predetermined search operations on a user interface for image-file control; an image file is extracted using the IP interface for image-file remote connections; and the extracted image file is processed based on at least information associated with a click operation detected on a control-program interface provided by the user interface.

According to another embodiment, a device for processing image files includes: a search module configured to search for an IP interface for image-file remote connections on a Local Area Network (LAN) based on at least information associated with one or more predetermined search operations on a user interface for image-file control, an extracting module configured to extract an image file using the IP interface for image-file remote connections, and a processing module configured to process the extracted image file based on at least information associated with a click operation detected on a control-program interface provided by the user interface.

According to yet another embodiment, a non-transitory computer readable storage medium comprises programming instructions for processing image files. The programming instructions are configured to cause one or more data processors to execute certain operations. For example, an IP interface for image-file remote connections is searched for on a Local Area Network (LAN) based on at least information associated with one or more predetermined search operations on a user interface for image-file control; an image file is extracted using the IP interface for image-file remote connections; and the extracted image file is processed based on at least information associated with a click operation detected on a control-program interface provided by the user interface.

For example, the systems and methods described herein are configured to provide a user interface for manually or automatically searching for an IP interface for image-file remote connections on a LAN and extracting corresponding image files to be processed accordingly on the user interface, so that a simple and intuitive extraction of processed image files or image files under processing directly from an image-processing software (e.g., Photoshop) on the LAN to realize image-file sharing across devices. In another example, the systems and methods described herein are configured to capture and store screenshots of an image file quickly to allow verification of a processing history of an image files at a later time, and send the image file via instant messaging, e-mail, or other communication means to realize image-file sharing. In yet another example, the systems and methods described herein are configured to achieve a self-adapted display of the image file and refresh manually a connection between devices to overcome network instability.

Depending upon embodiment, one or more benefits may be achieved. These benefits and various additional objects, features and advantages of the present invention can be fully appreciated with reference to the detailed description and accompanying drawings that follow.

DETAILED DESCRIPTION OF THE INVENTION

Figure 1:
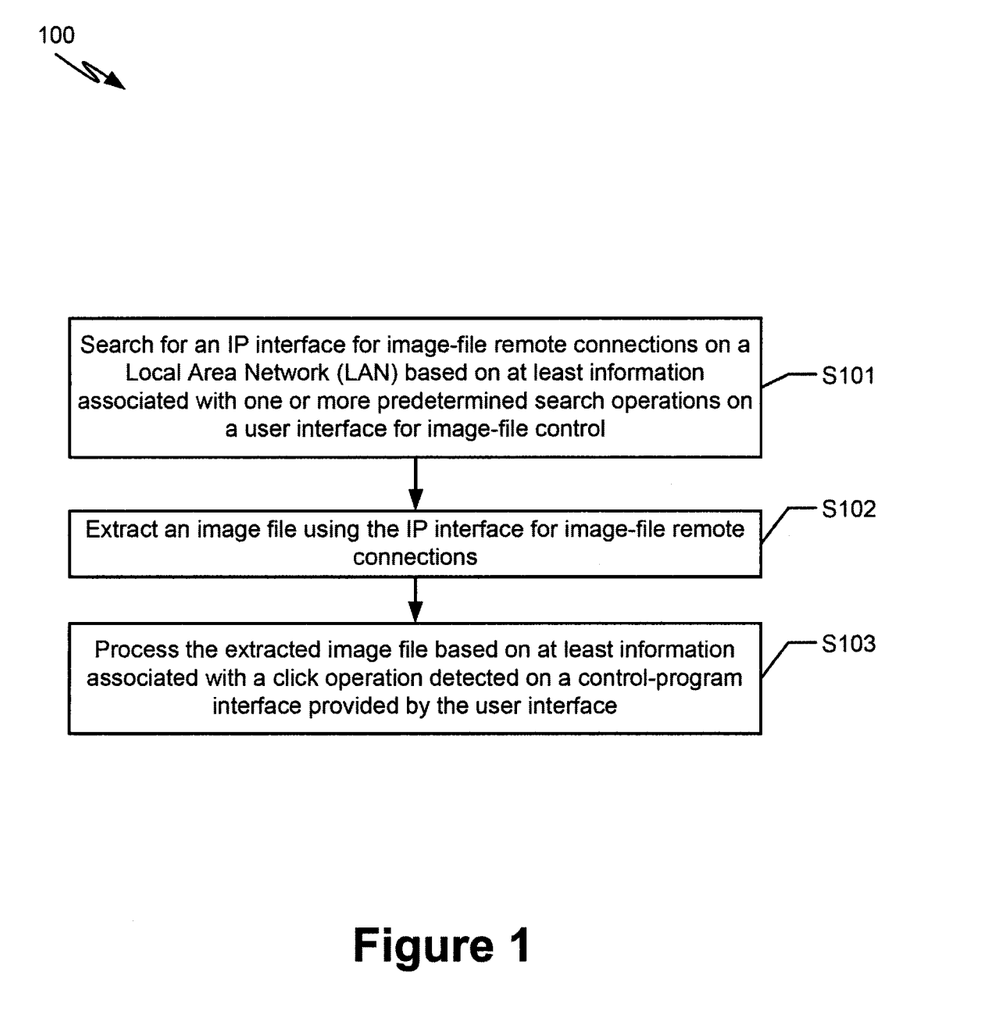
FIG. 1 is a simplified diagram showing a method for processing image files according to one embodiment of the present invention.

FIG. 1 is a simplified diagram showing a method for processing image files according to one embodiment of the present invention. This diagram is merely an example, which should not unduly limit the scope of the claims. One of ordinary skill in the art would recognize many variations, alternatives, and modifications. The method 100 includes at least the process S101 for searching for an IP interface for image-file remote connections on a Local Area Network (LAN) based on at least information associated with one or more predetermined search operations on a user interface for image-file control, the process S102 for extracting an image file using the IP interface for image-file remote connections, and the process S103 for processing the extracted image file based on at least information associated with a click operation detected on a control-program interface provided by the user interface.

According to one embodiment, the process S101 includes searching for an IP interface for image-file remote connections on a Local Area Network (LAN) based on at least information associated with one or more predetermined search operations on a user interface for image-file control. For example, in an image-processing software such as Photoshop, an interface for image-file remote connections is set up to facilitate remote control of Photoshop from a smart phone. Specifically, when a remote-control option in an "Edit" item in a menu on a user interface of Photoshop (e.g., of a version newer than CS5.5) is turned on, users can locate a Photoshop server and remotely control a Photoshop process on a computer so as to extract an image file under processing from a Photoshop interface. In another example, when an image-processing software, such as Photoshop, opens a corresponding remote connection, TCP communications are carried out based on SOCKET. As an example, personal computers provide a corresponding IP interface for image-file remote control, i.e., a hotspot Access Point (AP) for image-file remote control, and other devices are able to connect to the interface using an IP address through a wired or wireless connection on the LAN, in order to extract an image file from the image-processing software for processing. According to another embodiment, during the process S101, a start-search button is provided on a user interface. For example, when a user clicks the start-search button, a smart phone begins searching automatically for one or more IP interfaces for image-file remote connections that are opened on the LAN (e.g., via Wi-Fi) based on a zero configuration networking technology.

Figure 2:
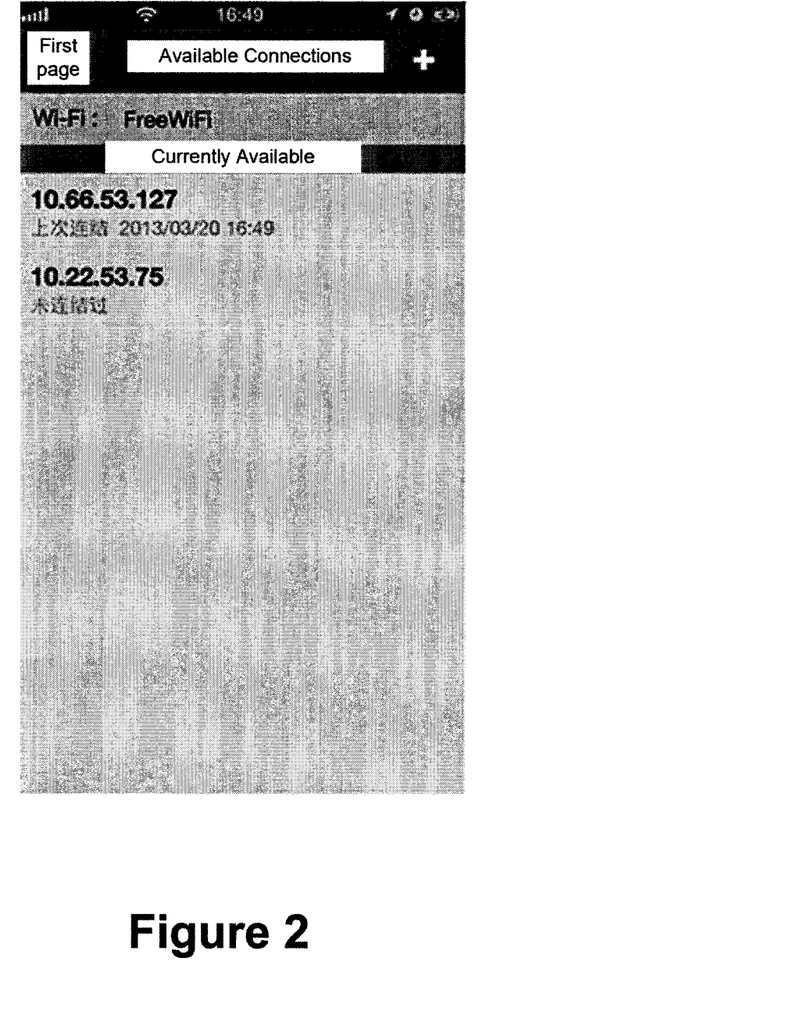
FIG. 2 is a simplified diagram showing results of searching for IP interfaces according to one embodiment of the present invention.

FIG. 2 is a simplified diagram showing results of searching for IP interfaces according to one embodiment of the present invention. This diagram is merely an example, which should not unduly limit the scope of the claims. One of ordinary skill in the art would recognize many variations, alternatives, and modifications. As shown in FIG. 2, two addresses for IP interfaces, i.e., "10.66.53.127" and "10.22.53.75," are found to be currently available, in some embodiments. For example, a user chooses a particular IP interface among the search results and gains access to the remote connections of an image-processing software (e.g., Photoshop) using a SOCKET/TCP protocol through a wired or wireless connection, in order to remotely control the image-processing software.

Referring back to FIG. 1, alternatively, in the process S101, a search input box is provided on the user interface, in some embodiments. For example, a user manually enters an address of an IP interface in the search input box, or enters the address of the IP interface and access instructions in the search input box.

Figure 3:
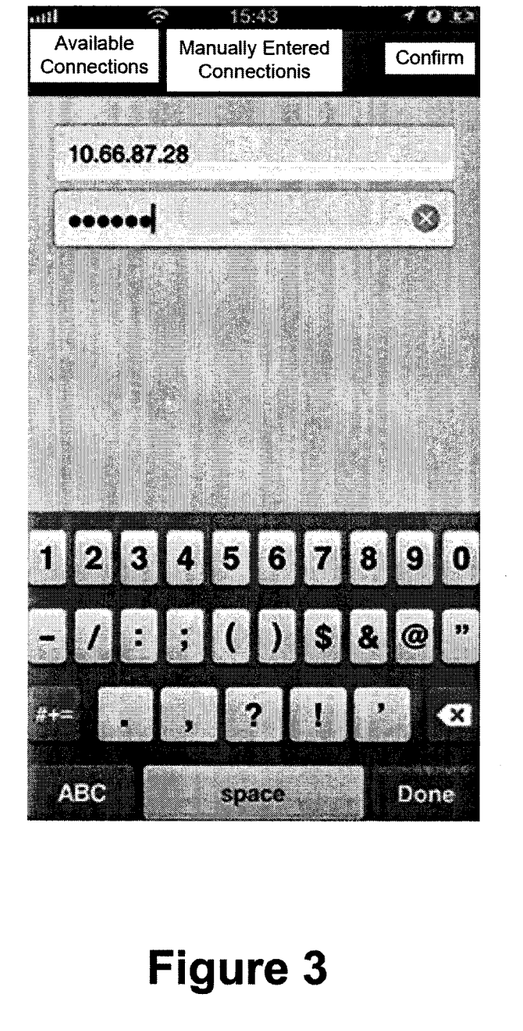
FIG. 3 is a simplified diagram showing a search input box on a user interface according to one embodiment of the present invention.

FIG. 3 is a simplified diagram showing a search input box on a user interface according to one embodiment of the present invention. This diagram is merely an example, which should not unduly limit the scope of the claims. One of ordinary skill in the art would recognize many variations, alternatives, and modifications. According to one embodiment, after entering the corresponding address of the IP interface and the access instructions, a user gains access to the remote connections of the image-processing software (e.g., Photoshop) using the SOCKET/TCP protocol through a wired or wireless connection in order to remotely control the image-processing software.

Referring back to FIG. 1, the process S102 includes extracting an image file via the IP interface for image-file remote connections, according to some embodiments. For example, after accessing the image-processing software via the IP interface for image-file remote connections, a user remotely controls one or more image files in the image-processing software corresponding to the IP interface. As an example, the user extracts an image file currently being processed by the image-processing software.

According to yet another embodiment, during the process S 103, the extracted image file is processed in response to a click operation, when the click operation is detected on a control-program interface by the user interface. For example, the control-program interface includes: a screen-shot-control interface, a sharing-control interface, a size-display-control interface, or other suitable interfaces. In another example, the sharing-control interface includes an instant-messaging interface, an e-mail-communication interface, or other suitable interfaces.

Figure 4:
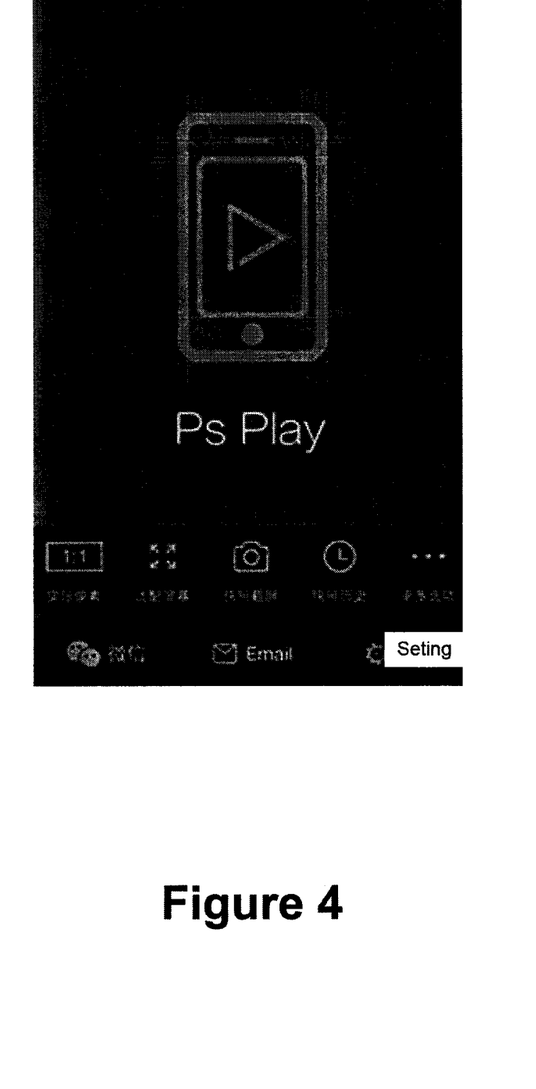
FIG. 4 is a simplified diagram showing a user interface including a control-program interface according to one embodiment of the present invention.

FIG. 4 is a simplified diagram showing a user interface including a control-program interface according to one embodiment of the present invention. This diagram is merely an example, which should not unduly limit the scope of the claims. One of ordinary skill in the art would recognize many variations, alternatives, and modifications.

Figure 5:
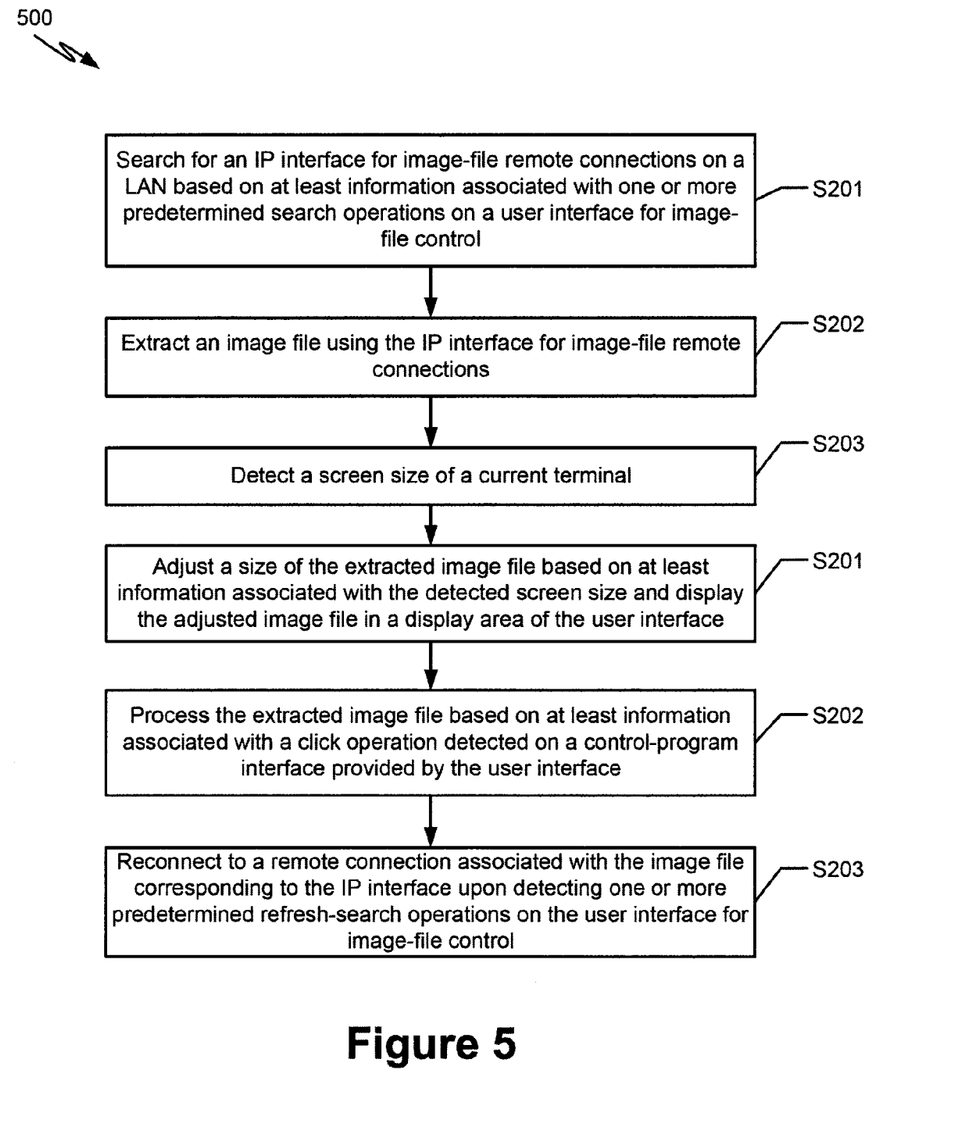
FIG. 5 is a simplified diagram showing a method for processing image files according to another embodiment of the present invention.

FIG. 5 is a simplified diagram showing a method for processing image files according to another embodiment of the present invention. This diagram is merely an example, which should not unduly limit the scope of the claims. One of ordinary skill in the art would recognize many variations, alternatives, and modifications. The method 500 includes at least the process S201 for searching for an IP interface for image-file remote connections on a LAN based on at least information associated with one or more predetermined search operations on a user interface for image-file control, the process S202 for extracting an image file using the IP interface for image-file remote connections, the process S203 for detecting a screen size of a current terminal, the process S204 for adjusting a size of the extracted image file based on at least information associated with the detected screen size and displaying the adjusted image file in a display area of the user interface, the process S205 for processing the extracted image file based on at least information associated with a click operation detected on a control-program interface provided by the user interface, and the process S206 for reconnecting to a remote connection associated with the image file corresponding to the IP interface upon detecting one or more predetermined refresh-search operations on the user interface for image-file control.

According to one embodiment, during the process S201, an IP interface for image-file remote connections is searched for on a LAN based on at least information associated with one or more predetermined search operations on a user interface for image-file control. For example, the process S201 includes: upon detecting one or more predetermined start-search operations on the user interface for image-file control, searching automatically for the IP interface for image-file remote connections on the LAN based on at least information associated with a zero-configuration networking technology to access to one or more remote connections associated with the image file corresponding to an address of the IP interface. As an example, the process S201 includes: upon detecting an entry of a target IP interface address in an input box on the user interface for image-file control, or the entry of the target IP interface address plus an entry of access instructions, searching for the IP interface for image-file remote connections corresponding to the target IP interface address on the LAN to access to one or more remote connections associated with the image file corresponding to the target IP interface address.

According to another embodiment, during the process S202, an image file is extracted using the IP interface for image-file remote connections. For example, during the process S203, the screen size of the current terminal is detected. In another example, during the process S204, a size of the extracted image file is adjusted based on at least information associated with the detected screen size and the adjusted image file is displayed in a display area of the user interface. As an example, the size of the image file is automatically adjusted according to the size of the screen of the current terminal (e.g., a smart phone) in order to display the extracted image file in full screen on the current terminal. In another example, after the image file is extracted, a direction detection is performed on the current terminal, and a horizontally or vertically self-adapted display of the image file is carried out.

According to yet another embodiment, during the process S205, the extracted image file is processed based on at least information associated with a click operation detected on a control-program interface provided by the user interface. For example, the control-program interface includes: a screenshot-control interface, a sharing-control interface, a size-display-control interface, or other suitable interfaces. As an example, the process S205 includes: capturing one or more screenshots associated with the image file displayed on the screen of the current terminal, in response to the click operation being detected on the screenshot-control interface provided by the user interface and saving the one or more screenshots. In another example, saving the screenshots allows comparison of the image file captured at different times to understand a modification process involving part of or all of the image file.

According to yet another embodiment, the process S205 further includes: calling a communication application corresponding to the sharing-control interface in response to the click operation being detected on the sharing-control interface provided by the user interface and sharing the image file or the saved screenshots with other terminals via the communication application. For example, the sharing-control interface includes an instant-messaging interface, a social-networking-communication interface, an e-mail-communication interface, or other suitable interfaces. In another example, a user of a current terminal is able to share captured screenshots with users of other terminals directly through third-party applications, or save the captured screenshots on the network for permanent storage and future extraction via instant-messaging communication applications, social-networking communication applications, e-mail communication applications.

In one embodiment, the control-program interface provided by the user interface includes a size-display-control interface. For example, the process S205 includes: adjusting a size of a display area of the user interface in response to the click operation being detected on the size-display-control interface provided by the user interface and displaying the extracted image file within the resized display area of the user interface. In another example, after the process S203 and the process S204 performed on the extracted image file, the size of the display area of the user interface is adjusted if the user clicks on the size-display-control interface, e.g., on the "Real-time Pixel" button as shown in FIG. 4. Then, the extracted image file is displayed within the resized display area of the user interface, and the user is able to view the extracted image file by sliding up and down or sliding left and right on the screen, in certain embodiments. For example, the user can zoom in/out the extracted image file with a fixed scaling, view the image file at an actual size (e.g., 1:1), or view the image file at full screen.

In another embodiment, during the process S206, a remote connection associated with the image file corresponding to the IP interface is reconnected, upon detecting one or more predetermined refresh-search operations on the user interface for image-file control. For example, a "Refresh" button indicating refresh-search operations is provided on the user interface, and the user clicks on the "Refresh" button to reconnect to the currently accessed IP interface via the address of the IP interface and extract the latest image file normally to ensure an uninterrupted connection.

Figure 6:
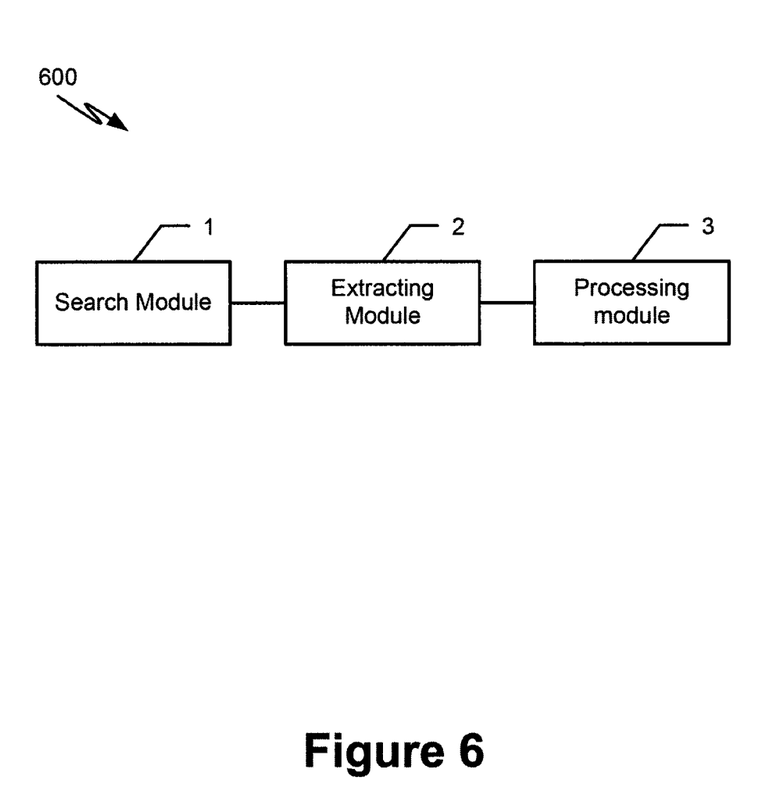
FIG. 6 is a simplified diagram showing a device for processing image files according to one embodiment of the present invention.

FIG. 6 is a simplified diagram showing a device for processing image files according to one embodiment of the present invention. This diagram is merely an example, which should not unduly limit the scope of the claims. One of ordinary skill in the art would recognize many variations, alternatives, and modifications. The device 600 includes a search module 1, an extracting module 2, and a processing module 3.

According to one embodiment, the search module 1 is configured to search for an IP interface for image-file remote connections on a Local Area Network (LAN) based on at least information associated with one or more predetermined search operations on a user interface for image-file control. For example, the extracting module 2 is configured to extract an image file using the IP interface for image-file remote connections. In another example, the processing module 3 is configured to process the extracted image file based on at least information associated with a click operation detected on a control-program interface provided by the user interface. As an example, a start-search button is provided on the user interface, and when a user clicks on the start-search button, the searching module 1 is configured to search automatically for one or more IP interfaces for image-file remote connections that are opened on the LAN (e.g., via Wi-Fi) based on a zero configuration networking technology. In another example, when the user chooses a particular IP interface among the search results, the search module 1 is configured to gain access to the remote connections of an image-processing software (e.g., Photoshop) using a SOCKET/TCP protocol through a wired or wireless connection. Alternatively, a search input box is provided on the user interface, and the user manually enters an address of an IP interface in the search input box, or enters the address of the IP interface and access instructions in the search input box, in some embodiments. For example, based on the manually entered address of the IP interface and/or the access instructions, the search module 1 is configured to gain access to the remote connections of an image-processing software (e.g., Photoshop) using a SOCKET/TCP protocol through a wired or wireless connection. In another example, after accessing the image-processing software, the user remotely controls the image file. For example, the extracting module 2 is configured to extract the image file under processing from the image-processing software.

According to another embodiment, the control-program interface includes: a screenshot-control interface, a sharing-control interface, a size-display-control interface, or other suitable interfaces. For example, the sharing-control interface includes an instant-messaging interface, an e-mail-communication interface, or other suitable interfaces. In another example, upon a click operation on the corresponding interface, the processing module 3 is configured to perform relevant operations on the image file extracted by the extracting module 2 in response to the click operation.

Figure 7:
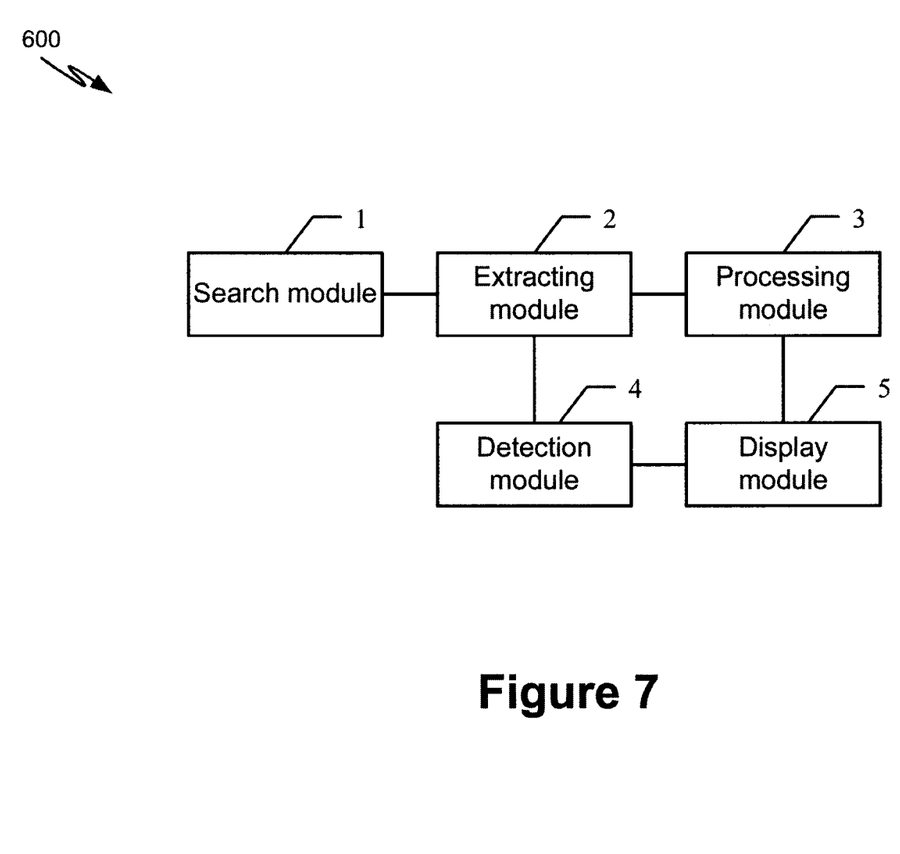
FIG. 7 is a simplified diagram showing a device for processing image files according to another embodiment of the present invention.

FIG. 7 is a simplified diagram showing the device 600 for processing image files according to another embodiment of the present invention. This diagram is merely an example, which should not unduly limit the scope of the claims. One of ordinary skill in the art would recognize many variations, alternatives, and modifications. In addition to the search module 1, the extracting module 2 and the processing module 3, the device 600 further includes: a detection module 4 and a display module 5.

According to one embodiment, the detection module 4 is configured to detect a screen size of a current terminal. For example, the display module 5 is configured to adjust a size of the extracted image file based on at least information associated with the detected screen size and display the adjusted image file in a display area of the user interface. In another example, according to the screen size of the current terminal (e.g., a smart phone) detected by the detection module 4, the display module 5 is configured to automatically adjust the size of the image file in order to display the extracted image file in full screen at the current terminal. In yet another example, after the image file is extracted, the display module 5 is configured to perform a direction detection on the current terminal and carry out a horizontally or vertically self-adapted display of the image file.

Figure 8:
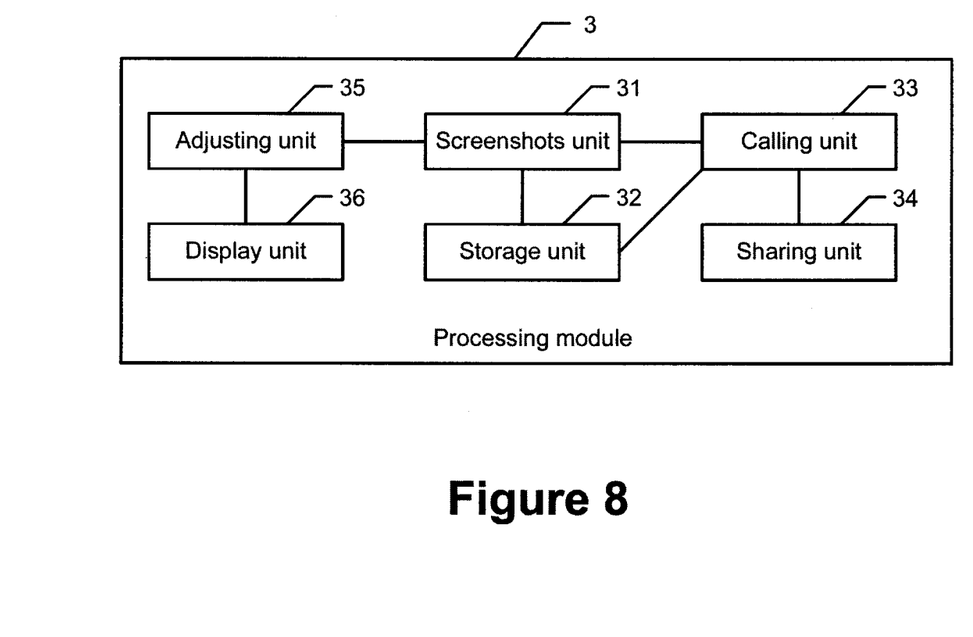
FIG. 8 is a simplified diagram showing a processing module as part of the device as shown in FIG. 6 or FIG. 7 according to one embodiment of the present invention.

FIG. 8 is a simplified diagram showing the processing module 3 as part of the device 600 according to one embodiment of the present invention. This diagram is merely an example, which should not unduly limit the scope of the claims. One of ordinary skill in the art would recognize many variations, alternatives, and modifications.

According to one embodiment, the control-program interface provided by the user interface includes a screenshot-control interface. For example, the processing module 3 includes: a screenshots unit 31 configured to capture one or more screenshots associated with the image file displayed on the screen of the current terminal, in response to the click operation being detected on the screenshot-control interface provided by the user interface, and a storage unit 32 configured to save the one or more screenshot. As an example, the control-program interface provided by the user interface includes a sharing-control interface. In another example, the processing module 3 further includes: a calling unit 33 configured to call a communication application corresponding to the sharing-control interface in response to the click operation being detected on the sharing-control interface provided by the user interface, and a sharing unit 34 configured to share the image file or the saved screenshots with other terminals via the communication application. In yet another example, the sharing-control interface includes an instant-messaging interface, a social-networking-communication interface, an e-mail-communication interface, or other suitable interfaces.

According to another embodiment, the control-program interface provided by the user interface includes a size-display-control interface. For example, the processing module 3 includes: an adjusting unit 35 configured to adjust a size of a display area of the user interface in response to the click operation being detected on the size-display-control interface provided by the user interface, and a display unit 36 configured to display the extracted image file within the resized display area of the user interface.

Figure 9:
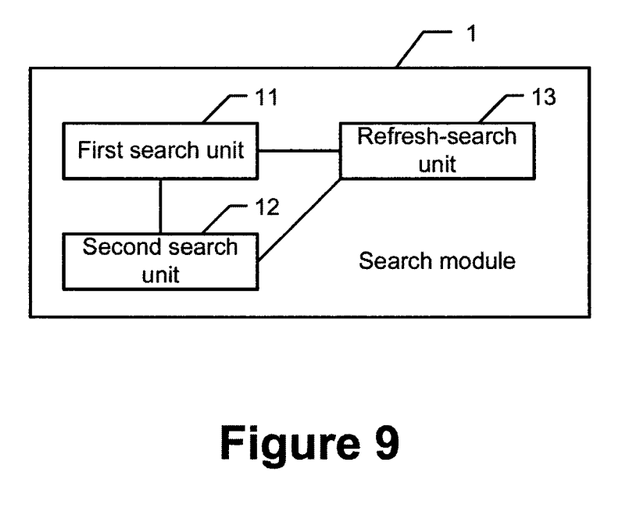
FIG. 9 is a simplified diagram showing a search module as part of the device as shown in FIG. 6 or FIG. 7 according to one embodiment of the present invention.

FIG. 9 is a simplified diagram showing the search module 1 as part of the device 600 according to one embodiment of the present invention. This diagram is merely an example, which should not unduly limit the scope of the claims. One of ordinary skill in the art would recognize many variations, alternatives, and modifications.

According to one embodiment, the search module 1 includes: a first search unit 11 configured to search automatically for the IP interface for image-file remote connections on the LAN based on at least information associated with a zero-configuration networking technology to access to one or more remote connections associated with the image file corresponding to an address of the IP interface upon detecting one or more predetermined start-search operations on the user interface for image-file control, and a second search unit 12 configured to search for the IP interface for image-file remote connections corresponding to the target IP interface address on the LAN to access to one or more remote connections associated with the image file corresponding to the target IP interface address upon detecting an entry of a target IP interface address in an input box on the user interface for image-file control, or the entry of the target IP interface address plus an entry of access instructions.

According to another embodiment, the search module 1 includes: a refresh-search unit 13 configured to reconnecting to a remote connection associated with the image file corresponding to the IP interface upon detecting one or more predetermined refresh-search operations on the user interface for image-file control. For example, a "Refresh" button indicating refresh-search operations is provided on the user interface, and the user clicks on the "Refresh" button to reconnect to the currently accessed IP interface via the address of the IP interface and extract the latest image file normally to ensure an uninterrupted connection. As an example, the search module 1 includes all of the first search unit 11, the second search unit 12, and the refresh-search unit 13.

According to one embodiment, a method is provided for processing image files. For example, an IP interface for image-file remote connections is searched for on a Local Area Network (LAN) based on at least information associated with one or more predetermined search operations on a user interface for image-file control; an image file is extracted using the IP interface for image-file remote connections; and the extracted image file is processed based on at least information associated with a click operation detected on a control-program interface provided by the user interface. For example, the method is implemented according to at least FIG. 1, and/or FIG. 5.

According to another embodiment, a device for processing image files includes: a search module configured to search for an IP interface for image-file remote connections on a Local Area Network (LAN) based on at least information associated with one or more predetermined search operations on a user interface for image-file control, an extracting module configured to extract an image file using the IP interface for image-file remote connections, and a processing module configured to process the extracted image file based on at least information associated with a click operation detected on a control-program interface provided by the user interface. For example, the device is implemented according to at least FIG. 6, FIG. 7, FIG. 8, and/or FIG. 9.

According to yet another embodiment, a non-transitory computer readable storage medium comprises programming instructions for processing image files. The programming instructions are configured to cause one or more data processors to execute certain operations. For example, an IP interface for image-file remote connections is searched for on a Local Area Network (LAN) based on at least information associated with one or more predetermined search operations on a user interface for image-file control; an image file is extracted using the IP interface for image-file remote connections; and the extracted image file is processed based on at least information associated with a click operation detected on a control-program interface provided by the user interface. For example, the storage medium is implemented according to at least FIG. 1, and/or FIG. 5.

The above only describes several scenarios presented by this invention, and the description is relatively specific and detailed, yet it cannot therefore be understood as limiting the scope of this invention's patent. It should be noted that ordinary technicians in the field may also, without deviating from the invention's conceptual premises, make a number of variations and modifications, which are all within the scope of this invention. As a result, in terms of protection, the patent claims shall prevail.

For example, some or all components of various embodiments of the present invention each are, individually and/or in combination with at least another component, implemented using one or more software components, one or more hardware components, and/or one or more combinations of software and hardware components. In another example, some or all components of various embodiments of the present invention each are, individually and/or in combination with at least another component, implemented in one or more circuits, such as one or more analog circuits and/or one or more digital circuits. In yet another example, various embodiments and/or examples of the present invention can be combined.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein. Other implementations may also be used, however, such as firmware or even appropriately designed hardware configured to carry out the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.).

It is noted that data structures describe formats for use in organizing and storing data in databases, programs, memory, or other computer-readable media for use by a computer program.

The systems and methods may be provided on many different types of computer-readable media including computer storage mechanisms (e.g., CD-ROM, diskette, RAM, flash memory, computer's hard drive, etc.) that contain instructions (e.g., software) for use in execution by a processor to perform the methods' operations and implement the systems described herein.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope or of what may be claimed, but rather as descriptions of features specific to particular embodiments. Certain features that are described in this specification in the context or separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A device for processing image files, the device comprising:
a search module configured to search for an IP interface for image-file remote connections on a Local Area Network (LAN) based on at least information associated with one or more predetermined search operations on a user interface for image-file control;
an extracting module configured to extract an image file using the IP interface for image-file remote connections; and
a processing module configured to process the extracted image file based on at least information associated with a click operation detected on a control-program interface provided by the user interface, wherein:
the control-program interface further includes a sharing-control interface;
the processing module further includes:
a calling unit configured to call a communication application corresponding to the sharing-control interface in response to the click operation being detected on the sharing-control interface; and
a sharing unit configured to share the image file or one or more screenshots associated with the image file with other terminals via the communication application; and
the sharing-control interface includes at least one of an instant-messaging interface, a social-networking-communication interface, and an e-mail-communication interface.

2. The device of claim 1, further comprising:
a detection module configured to detect a screen size of a current terminal; and
a display module configured to adjust a size of the extracted image file based on at least information associated with the detected screen size and display the adjusted image file in a display area of the user interface.

3. The device of claim 2, wherein:
the control-program interface includes a screenshot-control interface; and
the processing module includes:
a screenshots unit configured to capture the one or more screenshots associated with the image file displayed on the screen of the current terminal, in response to the click operation being detected on the screenshot-control interface provided by the user interface; and
a storage unit configured to save the one or more screenshots.

4. The device of claim 1, wherein:
the control-program interface includes a size-display-control interface; and
the processing module includes:
an adjusting unit configured to adjust a size of a display area of the user interface in response to the click operation being detected on the size-display-control interface; and
a display unit configured to display the extracted image file within the resized display area of the user interface.

5. The device of claim 1, wherein the search module includes:
a first search unit configured to search automatically for the IP interface for image-file remote connections on the LAN based on at least information associated with a zero-configuration networking technology to access to one or more remote connections associated with the image file corresponding to an address of the IP interface upon detecting one or more predetermined start-search operations on the user interface for image-file control; and
a second search unit configured to search for the IP interface for image-file remote connections corresponding to the target IP interface address on the LAN to access to one or more remote connections associated with the image file corresponding to the target IP interface address upon detecting an entry of a target IP interface address in an input box on the user interface for image-file control, or the entry of the target IP interface address plus an entry of access instructions.

6. The device of claim 5, wherein the search module further includes:
a refresh-search unit configured to reconnecting to a remote connection associated with the image file corresponding to the IP interface upon detecting one or more predetermined refresh-search operations on the user interface for image-file control.

7. The device of claim 1, further comprising:
one or more data processors; and
a computer-readable storage medium;
wherein one or more of the search module, the extracting module, and the processing module are stored in the storage medium and configured to be executed by the one or more data processors.

8. A device for processing image files, the device comprising:
a search module configured to search for an IP interface for image-file remote connections on a Local Area Network (LAN) based on at least information associated with one or more predetermined search operations on a user interface for image-file control;
an extracting module configured to extract an image file using the IP interface for image-file remote connections;
a processing module configured to process the extracted image file based on at least information associated with a click operation detected on a control-program interface provided by the user interface,
wherein the control-program interface provided by the user interface includes a screenshot-control interface, and
wherein the processing module includes:
a screenshots unit configured to capture one or more screenshots associated with the image file displayed on the screen of the current terminal, in response to the click operation being detected on the screenshot-control interface provided by the user interface; and
a storage unit configured to save the one or more screenshots;
a detection module configured to detect a screen size of a current terminal; and
a display module configured to adjust a size of the extracted image file based on at least information associated with the detected screen size and display the adjusted image file in a display area of the user interface, wherein:
the control-program interface provided by the user interface further includes a sharing-control interface;
the processing module further includes:
a calling unit configured to call a communication application corresponding to the sharing-control interface in response to the click operation being detected on the sharing-control interface; and a sharing unit configured to share the image file or the saved screenshots with other terminals via the communication application; and the sharing-control interface includes at least one of an instant-messaging interface, a social-networking-communication interface, and an e-mail-communication interface.

9. A non-transitory computer readable storage medium comprising programming instructions for processing image files, the programming instructions configured to cause one or more data processors to execute operations comprising:

searching for an IP interface for image-file remote connections on a Local Area Network (LAN) based on at least information associated with one or more predetermined search operations on a user interface for image-file control;

extracting an image file using the IP interface for image-file remote connections; and processing the extracted image file based on at least information associated with a click operation detected on a control-program interface provided by the user interface, wherein:

the control-program interface includes a sharing-control interface;

the processing the extracted image file based on at least information associated with the click operation detected on the control-program interface includes:

calling, by a calling unit of the device, a communication application corresponding to the sharing-control interface in response to the click operation being detected on the sharing-control interface; and sharing, by a sharing unit of the device, the image file or one or more screenshots associated with the image file with other terminals via the communication application; and the sharing-control interface includes at least one of an instant-messaging interface, a social-networking-communication interface, and an e-mail-communication interface.

* * * * *